United States Patent
Brock

[15] 3,680,467
[45] Aug. 1, 1972

[54] CLIMATE CONDITIONER FOR MOTOR VEHICLES

[72] Inventor: Walter B. Brock, 6012 Loomis Road, Victor, N.Y. 14564

[22] Filed: Dec. 28, 1970

[21] Appl. No.: 101,933

[52] U.S. Cl. ................98/2.11, 62/244, 62/402, 62/402
[51] Int. Cl. ..............................B60h 1/24
[58] Field of Search............98/2, 11, 5, 6, 10, 14, 15, 98/21, 23; 62/244, 243, 401, 402

[56] References Cited

UNITED STATES PATENTS

| | | | |
|---|---|---|---|
| 2,755,638 | 7/1956 | Sevin | 62/402 |
| 682,872 | 9/1901 | Jobson | 62/401 |
| 3,401,619 | 9/1968 | Sotory | 98/2.11 |

Primary Examiner—Meyer Perlin
Attorney—Shlesinger, Fitzsimmons & Slesinger

[57] ABSTRACT

A refillable tank of compressed air is carried in the trunk of an automobile and is connected with an air turbine that is mounted on the ceiling of the vehicle. The turbine rotor is attached to a fan. A pair of opposed nozzles fixed in the turbine housing direct jets of compressed air against angularly spaced vanes carried by the rotor. A time delay ON-OFF switch controls the flow of the compressed air to the jets. The compressed air cools rapidly upon being discharged from the nozzles, and drives the rotor and fan assembly, causing cool air to be blown into the car. A retractable shade is provided for the vehicle windshield, and the remaining windows are tinted to minimize solar heat in the car.

9 Claims, 3 Drawing Figures

PATENTED AUG 1 1972

3,680,467

INVENTOR.
WALTER B. BROCK
BY
Shlesinger, Fitzsimmons & Shlesinger
ATTORNEYS

CLIMATE CONDITIONER FOR MOTOR VEHICLES

This invention relates to motor vehicles, and more particularly to novel apparatus for controlling the temperature within a motor vehicle such as an automobile, bus, etc.

In recent years it has become quite common to incorporate air-conditioning units in passenger vehicles such as automobiles, buses, and the like. What many purchasers do not realize, however, is that the initial cost of such a unit is small compared to the added costs of operating the vehicle in which the unit is installed. For example, tests have indicated that automobiles using present day automotive air-conditioning units consume 25 percent or more gasoline than comparable vehicles operated without such units. Moreover, the presence of an air-conditioning unit in an automobile will necessarily increase its maintenance and repair costs, at least in proportion to the use made of the air conditioning unit.

In addition to these added expenses, air-conditioned vehicles of the type described have the further disadvantage that, because of the additional gasolene consumption, they produce greater quantities of objectionable exhaust fumes, as compared to the conventional automobile, thereby adding more rapidly to the pollution of our atmosphere, and further endangering the ecology. Also, contemporary automotive air conditioning units are relatively complex and difficult to service.

It is an object of this invention to provide for passenger vehicles such as automobiles, and the like, a novel climate or air conditioning system, which is substantially more compact, reliable and inexpensive, than prior such systems.

A further object of this invention is to provide an improved, substantially pollution-free air conditioning system for vehicles operated by internal combustion engines, which will function without any increase in the exhaust fumes of the vehicle.

A still further object of this invention is to provide a novel climate conditioning system for automotive vehicles which is designed to minimize heat transfer from the outside to the inside of a vehicle so that its interior will remain at a relatively constant temperature over a long period of time, even when the cooling unit is not operating.

Other objects of the invention will be apparent hereinafter from the specification and the recital of the appended claims, particularly when read in conjunction with the accompanying drawing.

Figure 1:
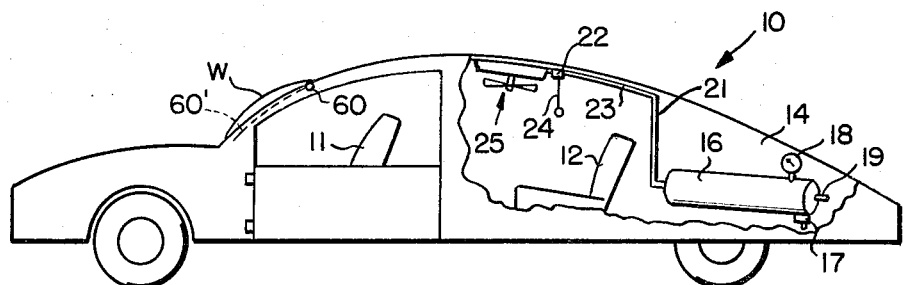
FIG. 1 is a side elevational view of an automobile, with parts broken away to illustrate schematically portions of an air conditioning system made in accordance with one embodiment of this invention.
Figure 2:
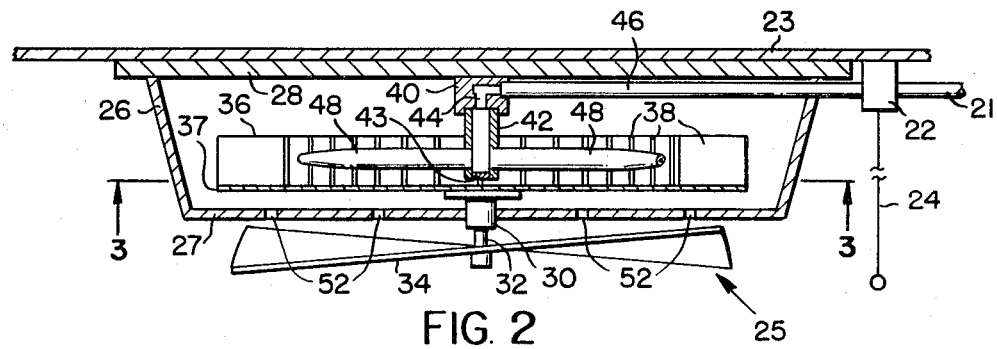
FIG. 2 is an enlarged, fragmentary, axial sectional view of the air turbine unit of the system that is mounted on the ceiling of the vehicle.

Referring now to the drawing by numerals of reference, 10 denotes an automobile, which, for purposes of this disclosure, may be a four-door sedan having the usual front and back seats 11 and 12, and a trunk compartment 14. Mounted in any suitable manner in compartment 14 is a compressed air tank or cylinder 16 having the usual condensate trap 17, and an air gauge 18, for indicating the pressure of the air in the cylinder. Mounted in one end of the cylinder 16 to be readily accessible, when the automobile trunk is open, is a conventional valve 19 for supplying compressed air to the cylinder. This valve may be similar to the type employed conventionally on automobile tires, so that cylinder 16 can readily be filled with compressed air by means of the usual air pump available at service stations.

At its opposite end cylinder 16 is connected by a tube or pipe 21 to a switch-operated normally-closed valve 22, which is mounted in any convenient location in the vehicle to be readily operable by its occupants. In the embodiment illustrated valve 22 is shown mounted on the ceiling 23 of the automobile. It is constructed to be opened by a conventional time-delay switch (not shown specifically) which is operable by a cord 24 that extends downwardly to the vicinity of seat 12; but it is to be understood that valve 22 may be located at any other convenient point in the automobile, and may be operated by means other than a cord, such as a push button, if desired.

Also mounted on ceiling 23 substantially centrally of the passenger area is an air turbine unit 25. This unit comprises an inverted, generally truncated-conical housing 26, which is closed at its lower end by a horizontal plate 27, and at its upper end by a plate 28, which is fastened to the underside of the ceiling or roof 23. Mounted intermediate its ends to rotate in a bearing 30, which is secured in a central opening in plate 27, is a shaft 32. Fastened to the lower end of shaft 32 for rotation thereby beneath plate 27 is a fan 34, the blades of which may be made of rubber or other resilient material. Fastened to the upper end of shaft 32 for rotation in bearing 30 above plate 27, and within the housing 26, is a rotor 36.

Figure 3:
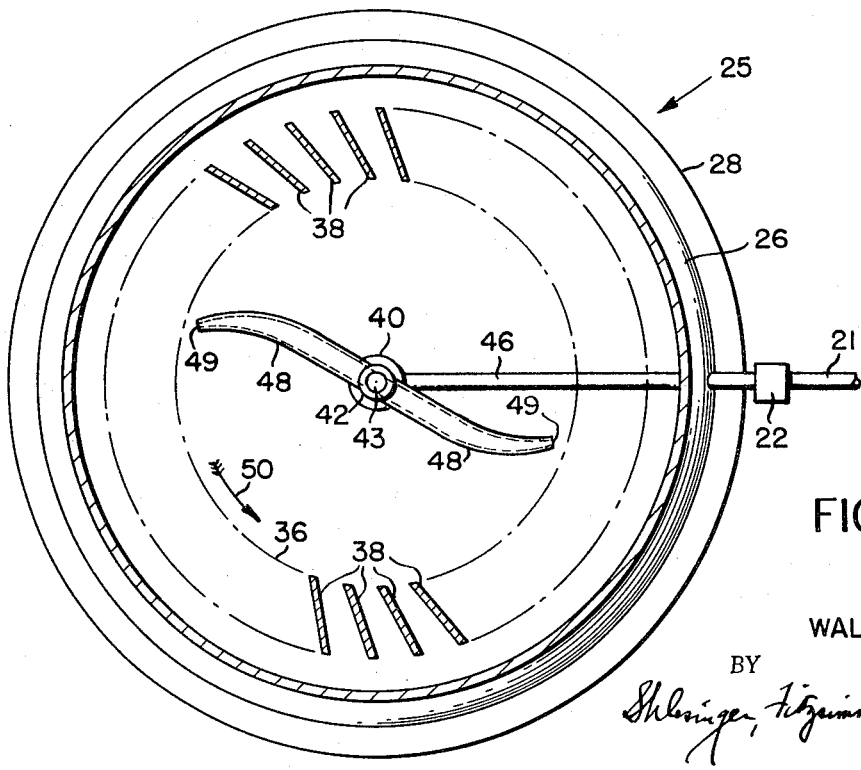
FIG. 3 is an enlarged, fragmentary sectional view taken along the line 3—3 in FIG. 2 looking in the direction of the arrows.

Rotor 36 comprises a disc 37, and a plurality of vanes 38 rigid with the disc and which project vertically upwardly from the disc at equi-angularly spaced points around the disc. As shown in FIG. 3, these vanes 38 are inclined in the same directions relative to planes radial of the axis of the disc but may be disposed in any manner conventional with turbine blades.

Secured at its upper end in a fitting 40, which is fastened to the underside of plate 28 centrally thereof, and projecting downwardly into the center of the rotor 36 coaxially of shaft 32, is a tubular conduit or nipple 42. Nipple 42 is sealed at its lower end by plug 43, and communicates at its upper end through a right-angular duct 44 in the fitting 40 with one end of a conduit 46, which connects duct 44 with valve 22.

Fastened at their inner ends in diametrally opposite sides of the hub 42 adjacent its lower end, and projecting radially from this hub toward the surrounding rotor vanes 38, are two diametrally opposed nozzles 48. These nozzles, which communicate at their inner ends with the bore in nipple 42, are curved adjacent their outer ends in the direction of inclination of the rotor vanes 38, so that when compressed air is discharged from their outer ends or orifices 49, the rotor 36, and hence the attached fan 34, rotate in the direction indicated by the arrow 50 in FIG. 3.

To operate this air conditioning or cooling unit, an occupant of the vehicle need only to pull on the cord 24. This will trip the time delay switch and open the valve 22 for whatever times, five, seven, nine, etc., minutes, as may be selected by the operator. The valve, when opened, connects the supply of compressed air in cylinder 16 to the nozzles 48, which, therefore, direct jets of compressed air through their orifices 49 against the vanes of rotor 36, thereby causing rotor 36 and the attached fan 34 to be rotated in the direction of arrow 50.

As the compressed air is discharged from the orifices 49, the sudden pressure drop in this air causes it to chill rapidly; and this cool air is drawn by the rotating fan 34 downwardly through a plurality of spaced openings 52 in the plate 27, and distributed throughout the automobile. When the timer-switch controlling the valve 22 counts out, the valve 22 returns to its OFF position, and the supply of compressed air to line 46 is shut off until the time-delay switch is again actuated.

Since repeated operation of valve 22 will diminish the compressed air supply in cylinder 16, and since, as is well known, most of the energy in sunlight passes easily through the closed windows of an automobile, and is absorbed by the upholstery and inner surfaces of the car, causing the heated surfaces to become secondary radiators heating up the interior of the automobile, it is desirable that the automobile 10 be well insulated against solar heat, thereby minimizing the frequency with which the cylinder 16 need be refilled. For this reason all of the windows of the automobile 10, with the exception of the windshield, are made, for example, from a blue tinted safety glass designed to reduce solar heat transmission to the vehicle interior.

In the case of the automobile's windshield W (FIG. 1), though, it is inadvisable to use a dark-tinted glare-reducing glass because it would very likely interfere with a night-time driver's vision. Therefore, to prevent undesirable heat transfer through the automobile windshield when the auto is not in use, and is parked, for example in the sunlight, a roller-type shade or sun visor 60 (FIG. 1) is mounted in the automobile 10 along the upper edge of the windshield so that, when desired, it can be drawn downwardly over the inside of the window as illustrated at 60' in FIG. 1. When the sun visor is drawn into its broken line or sun blocking position 60', it can be held there by an electromagnetically-operated catch (not illustrated) designed to release the shade or visor upon energization of the ignition circuit of the automobile, so that the shade then automatically returns to retracted position.

To minimize solar heat transfer through the visor 60, the outside surface of the visor, that is, the surface thereof confronting windshield W, should be white or aluminum, or other heat-reflecting color. Moreover, to minimize even further transfer of heat into the automobile from sunlight, the exterior portions of the car can be, and preferably are, painted to have light colored or heat-reflecting surfaces.

From the foregoing it will be apparent that the automotive cooling unit, or air-conditioning system described herein, is extremely simple and inexpensive as compared to prior car air-conditioning systems. System energy is supplied merely by pulling into a service station and having the tank 16 filled with compressed air in much the same manner that automobile tires are filled with air from a standard tire pump.

Moreover, in operation, this novel air conditioning system does not produce any objectionable fumes or other by-products that would tend further to pollute our atmosphere. Through the use of reflective colors for both exterior and interior surfaces of an auto, and through the use of cool, heat-resisting glass in the side and rear windows of the auto, and a roller-mounted or telescoping sun visor for the windshield of the auto, undesirable heating of the car by the sun, when the car is parked, and the car climate-control system is shut off, is minimized. Thus, the load on the system, when the car is started again, is also reduced to a minimum.

While in the embodiment illustrated the vaned member 36 is shown as rotatable relative to the nozzles 48, these nozzles if desired, can be mounted for rotation by the compressed air and the rotor 36 can be held stationary. In such case, the air discharged from the orifices 49 would drive nozzles 48 relative to the fixed or stationary vanes 38, and in a direction opposite to that denoted at 50 in FIG. 3. In such case, the nipple 42 would be mounted for rotation about its axis, and would be attached to the shaft 32 to impart its rotation through the shaft to the fan 34.

The cylinder 16 should be equipped with a safety valve to prevent careless overloading thereof, and also with an activated charcoal filter, or some similar device, at its outlet to filter the air before it passes through lines 21 and 46 to the nozzles 48.

Having thus described my invention, what I claim is:

1. A climate conditioning apparatus for motor vehicles, comprising
   a housing fastened to the ceiling of the passenger area of a motor vehicle,
   a first member mounted in said housing and having thereon a plurality of spaced, rigid vanes arranged in a circular path about a common axis,
   a second, tubular member having one end connected to a supply of compressed air and having a closed end surrounded by said vanes,
   nozzles secured to and projecting from said second member adjacent its closed end to direct jets of compressed air against said vanes, and
   means mounting one of said first and second members for rotation about said axis, when said jets impinge upon said vanes.

2. Climate conditioning apparatus as defined in claim 1, including a fan blade connected to said one member for rotation therewith and operative to distribute into said passenger area the air that is discharged from said nozzles.

3. Climate conditioning apparatus as defined in claim 2, wherein
   a shaft is mounted to rotate in the lower end of said housing about a vertical axis,
   said fan is secured to the lower end of said shaft for rotation thereby beneath said lower end of said housing, and
   said first member is secured to the upper end of said shaft for rotation above said lower end of said housing.

4. Climate conditioning apparatus as defined in claim 3, wherein said lower end of said housing has a plurality of openings therein for allowing the air discharged from said nozzles to flow out of said housing toward said fan to be distributed thereby.

5. Climate conditioning apparatus as defined in claim 3, wherein
said supply comprises a compressed air tank mounted in said vehicle and having in one end thereof a valve for releasably connecting said tank to a source of compressed air for replenishing said tank, and
a normally closed valve is interposed between the opposite end of said tank and said second member and is manually operable selectively to connect said tank to said nozzles.

6. Climate conditioning apparatus as defined in claim 3, wherein
a retractable shade is mounted above the windshield of said vehicle for movement into and out of an operative position in which it covers the inside of said windshield, and
the remaining windows in said vehicle are made of tinted, heat-reflective, transparent material.

7. An automotive vehicle having a plurality of side windows, a rear window, and a transparent front windshield, and air-conditioning apparatus for cooling the interior of the vehicle, and a sun-reflecting retractable shade mounted therein and movable into a position to cover the inside of said wind-shield to reflect sunlight from entering the vehicle,
said side and rear windows being tinted and heat-reflective,
said air-conditioning apparatus comprising
a fan rotatably mounted in the interior of the vehicle,
a turbine connected to said fan to drive the same,
a housing within which said turbine is mounted and having apertures in one wall thereof, and
nozzles for directing compressed air against said turbine to rotate the same and said fan,
said fan being rotatably mounted adjacent said one wall to circulate the compressed air flowing from said nozzles through said apertures to the interior of said vehicle.

8. A climate-conditioning system for an automotive vehicle comprising
a housing mounted inside the vehicle,
a compressed-air driven turbine mounted in said housing and comprising a disc having a plurality of vanes mounted thereon and a nozzle cooperating therewith and disposed to direct compressed air at said vanes,
a compressed air supply carried by said vehicle and coupled by a conduit to said nozzle to deliver compressed air to the nozzle to drive said turbine and to cause chilling of the air by the sudden pressure drop as the compressed air flows out of the nozzle into said housing,
said housing having apertures in one wall through which the compressed air from said nozzle may flow out of said housing,
a fan mounted outside said housing adjacent said one wall, and
means for driving said fan to draw air out of said apertures and circulate in the vehicle the chilled air flowing out of said apertures.

9. A climate-conditioning system as claimed in claim 8, wherein a valve is provided in said conduit to control flow of the compressed air from said supply to the nozzle, and
electrically operated means including a manually operable time delay switch controls the period during which said valve is open.

* * * * *